United States Patent Office.

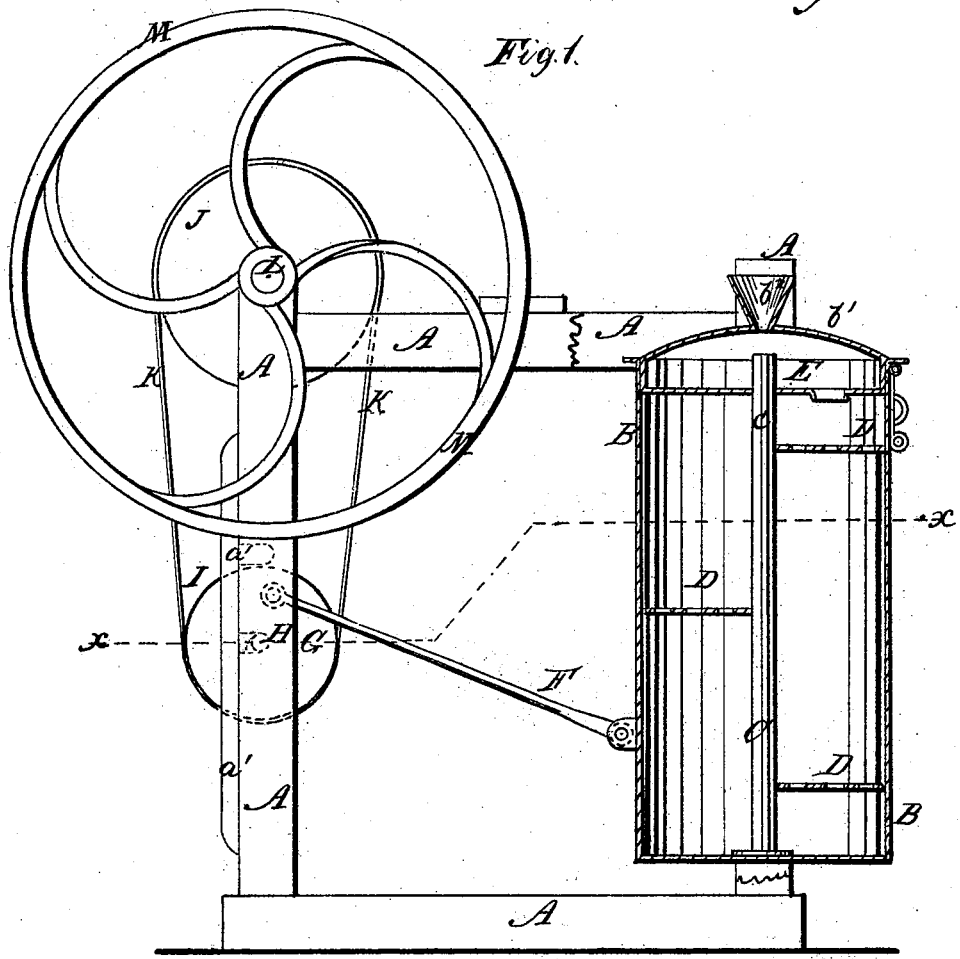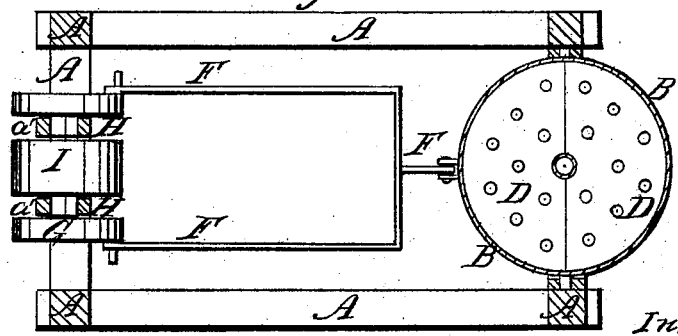

W. A. RHOADES, OF LINCOLNVILLE, PENNSYLVANIA.

Letters Patent No. 92,360, dated July 6, 1869.

IMPROVEMENT IN CHURNING-MACHINES.

The Schedule referred to in these Letters Patent and making part of the same.

*To all whom it may concern:*

Be it known that I, W. A. RHOADES, of Lincolnville, in the county of Crawford, and State of Pennsylvania, have invented a new and useful Improvement in Churning-Machines; and I do hereby declare that the following is a full, clear, and exact description thereof, which will enable others skilled in the art to make and use the same, reference being had to the accompanying drawings, forming part of this specification, in which—

Figure 1 is a side view of my improved churn, parts being broken away to show the construction.

Figure 2 is a horizontal section of the same, taken through the line $x\ x$, fig. 1.

Similar letters of reference indicate corresponding parts.

My invention has for its object to furnish an improved machine, by means of which the churning may be done easily, quickly, and conveniently; and It consists in the construction and combination of the various parts, as hereinafter more fully described.

A is the frame, the form and construction of which are immaterial.

B is the churn, which is made cylindrical in form, and which is pivoted, at or near its middle, to the frame A, so that it may swing or oscillate freely.

$b^1$ is the cover of the churn, which is made with a hole in its centre, provided with a short outwardly-projecting funnel-shaped pipe, $b^2$, to admit air, and prevent the milk from spattering out.

C is a rod, passing down through the centre of the churn, and which may have a small plate attached to its lower end, to prevent it from wearing the bottom of the churn.

To the rod C, at different heights, are attached semicircular perforated disks D, upon opposite sides of the rod C, as shown in fig. 1.

To the rod C, near its upper end, is attached a circular plate, E, fitting into the upper part of the churn B, and having a hole through it, for the admission of the air, and to prevent the spattering of the milk.

By this construction, as the churn is oscillated, the milk is forced through the semicircular perforated plates D, bringing the butter in a very short time.

To one side of the churn B is attached an ear, to which is pivoted one end of the rod, F, the other end of which is branched, and its ends are pivoted to the crank-pins of the crank-wheels G, which are attached to the shaft H, which revolves in notches in the upright bars of the frame A, where it is secured in place by bars $a'$ detachably secured to said upright bars.

To the shaft H, between the two crank-wheels G, is secured a pulley, I, around which, and around the pulley J, passes the band K.

The pulley J is secured to the shaft L, which revolves in bearings in the upper part of the frame A, and to one end of which is attached the crank-wheel M, by means of which power is applied to the machine, and which is made heavy, so as to serve as a fly-wheel.

Having thus described my invention,

I claim as new, and desire to secure by Letters Patent—

1. The rod C, the semicircular perforated plates or disks D, and circular plate E, in combination with the cylindrical pivoted churn B, substantially as herein shown and described, and for the purpose set forth.

2. The combination of the branched connecting-rod F, two crank-wheels G, shaft H, pulley I, band K, pulley J, shaft L, and heavy crank-wheel M, with each other, and with the churn B C D E, substantially as herein shown and described, and for the purpose set forth.

W. A. RHOADES.

Witnesses:
   T. A. BROWN,
   WM. BRIGHTMAN.